United States Patent [19]

Ahmed

[11] Patent Number: 5,774,726
[45] Date of Patent: Jun. 30, 1998

[54] SYSTEM FOR CONTROLLED GENERATION OF ASSEMBLY LANGUAGE INSTRUCTIONS USING ASSEMBLY LANGUAGE DATA TYPES INCLUDING INSTRUCTION TYPES IN A COMPUTER LANGUAGE AS INPUT TO COMPILER

[75] Inventor: Sultan Ahmed, Santa Clara, Calif.

[73] Assignee: Sun Microsystems, Inc., Palo Alto, Calif.

[21] Appl. No.: 427,444

[22] Filed: Apr. 24, 1995

[51] Int. Cl.$^6$ .................................. G06F 7/00; G06F 9/44
[52] U.S. Cl. .......................... 395/705; 395/708; 395/709
[58] Field of Search ................................. 395/700, 800, 395/705, 708, 709

[56] References Cited

U.S. PATENT DOCUMENTS

| | | | |
|---|---|---|---|
| 4,667,290 | 5/1987 | Goss et al. | 364/300 |
| 5,179,734 | 1/1993 | Candy et al. | 395/800 |
| 5,269,021 | 12/1993 | Denio et al. | 395/700 |
| 5,280,617 | 1/1994 | Brender et al. | 395/700 |
| 5,339,419 | 8/1994 | Chan et al. | 395/700 |
| 5,432,937 | 7/1995 | Tevanian et al. | 395/700 |
| 5,488,573 | 1/1996 | Brown et al. | 364/578 |
| 5,572,666 | 11/1996 | Whitman | 395/183.08 |
| 5,581,762 | 12/1996 | Hayashi et al. | 395/709 |

OTHER PUBLICATIONS

"A code generator for an Application Specific Pipelined Processor", Alves et al, IEEE, Jun. 1994, pp. 306–308.

"Direct Synthesis of Optimized DSP Assembly Code From Signal Flow Block Diagrams", Powell et al, IEEE, Sep. 1992, pp. V–553–V–556.

"Retargetable Assembly Code Generation by Bootstrapping", Leupers et al, IEEE, May 1994, pp. 88–93.

*Primary Examiner*—Thomas C. Lee
*Assistant Examiner*—Rehana Perveen
*Attorney, Agent, or Firm*—Beyer & Weaver, LLP

[57] ABSTRACT

A system and method are provided for controlling the generation of assembly language sequences. This is accomplished with a high level language which has as data types various elements of assembly language syntax. Included among the data types are "instructions" data types which specify variables having one or more assembly language instructions, e.g., floating point addition, integer load, conditional branch, etc. The grammar of the high level language permits variables of data type "instruction" to be output in standard assembly language syntax. By incorporating variables of assembly language data types, the language allows programmers employing functions, branch control, and other commonly employed programming techniques to write a programs which generate a large number of assembly language instructions in a controlled sequence.

21 Claims, 6 Drawing Sheets

Microfiche Appendix Included
(3 Microfiche, 257 Pages)

| No. of patterns generated | | | | | |
|---|---|---|---|---|---|
| 1 | 0 | 0 | 0 | 0 | 1 |
| 2 | 0 | 0 | 0 | 1 | 0 |
| 3 | 0 | 0 | 0 | 1 | 1 |
| 4 | 0 | 0 | 1 | 0 | 0 |
| 5 | 0 | 0 | 1 | 0 | 1 |
| 6 | 0 | 0 | 1 | 1 | 0 |
| 7 | 0 | 0 | 1 | 1 | 1 |
| 8 | 0 | 1 | 0 | 0 | 0 |
| 9 | 0 | 1 | 0 | 0 | 1 |

MASK_32 → 60 msk = #11100001cccrrrrzzzz0000....

62 →

| | | | | | | | | | | | | | | | | | | | |
|---|---|---|---|---|---|---|---|---|---|---|---|---|---|---|---|---|---|---|---|
| 1 | 1 | 1 | 1 | 0 | 0 | 0 | 0 | 1 | c | c | c | r | r | r | r | z | z | z | 0 | 0 | 0 | 0 |

(Rows 1–10 of binary data matrix follows)

Fig. 5

| to \ from | scalar | ordered-set | array | tuple |
|---|---|---|---|---|
| scalar | allowed if the variables are of the same data type | not allowed | allowed if array type and the scalar type are same | allowed |
| ordered-set | not allowed | allowed if the variables are of the same data type | allowed if the variables are of the same data type | allowed |
| array | not allowed | allowed if the variables are of the same data type | allowed if the variables are of the same data type | allowed |
| tuple | not allowed | not allowed | not allowed | allowed |

SYSTEM FOR CONTROLLED GENERATION OF ASSEMBLY LANGUAGE INSTRUCTIONS USING ASSEMBLY LANGUAGE DATA TYPES INCLUDING INSTRUCTION TYPES IN A COMPUTER LANGUAGE AS INPUT TO COMPILER

MICROFICHE APPENDIX

This specification includes a microfiche Appendix having 3 sheets with 257 frames. In the specification, any reference to Appendix is considered to be the microfiche Appendix.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights.

BACKGROUND OF THE INVENTION

The present invention relates to systems and methods for controlled generation of complex sequences of assembly language instructions. More particularly, the present invention relates to methods of using high level languages which have data types corresponding to certain assembly language elements.

Often it is desirable to generate specific sequences of assembly language instructions. For example, developers sometimes write programs or portions of programs in assembly language when they require careful control over certain functions in their programs. Further, during the development of microprocessors (in a process known as "design verification"), many sequences of assembly language instructions are generated and used to exhaustively test processor designs for bugs and performance. Unfortunately, writing assembly language code for either purpose is a rather tedious procedure.

Programs written in conventional high level languages such as "C" provide little control over the assembly language instructions that they produce when compiled. This is because the specific sequence of assembly language instructions produced upon compilation is largely a function of the compiler employed. For example, two different "C" compilers may be optimized such that they produce two different assembly language instruction sequences from the same "C" program. Thus, high level instruction sequences typically do not provide the fine control over assembly language instructions that is sometimes required.

In the field of design verification, random instruction generators are employed to provide some control over the generation of assembly instruction sequences. Such generators generate a purely random sampling of instructions in a processor's assembly language. The resulting sequence of instructions is then converted to machine code and executed on the processor or a logical representation of the processor. In related systems known as pseudo random test generators, each of the various instructions in an assembly language (e.g., load to a floating point register, branch on condition "x," etc.) are first "weighted" and then randomly sampled according to the weighting so that a resulting pseudo-random instruction sequence is biased toward instructions having higher weightings. These systems allow the developer to stress the microprocessor with certain types of instructions observed to cause difficulties (by weighting those instructions more heavily). For example, if a developer recognizes that instruction sequences having floating point operations identify a particularly high number of bugs, he or she may require that instructions for floating point operations be weighted more heavily. Although random and pseudo-random instruction generators can provide a wide range of possible instructions sequences with minimal user input, they do not allow fine control of assembly language instruction sequences that they generate.

Thus, there exists a need for a system that allows a user to directly control the generation of assembly language instruction sequences without forcing the user to write each instruction.

SUMMARY OF THE INVENTION

The present invention provides a system and method for using a high level language which provides various elements of assembly language syntax as data types. For example, the language may have an "instruction" data type which specifies one or more assembly language instructions, e.g., floating point addition, integer load, conditional branch, etc. When a variable of such data type is output, it is provided in the format of an assembly language instruction which can be directly assembled to machine code. Various functions are available to specifically control the op code and operands of the output instructions. It is intended that these functions and variables of the assembly language data types be used in conjunction with commonly employed programming techniques to write programs that are executed to output sequences of assembly language instructions. Thus, the method of this invention allows precise and automatic control over output sequences of assembly language instructions for design verification, applications development, etc.

One aspect of the present invention provides a specific method for controlling the generation of a sequence of assembly language instructions with a language which allows declaration of variables in data types which specify assembly language syntax elements. The method can be characterized as including the following steps: (1) providing a program containing code for generating the sequence of assembly language instructions (the program is written in a language which allows declaration of assembly language syntax data types); and (2) compiling the program to produce a desired sequence of assembly language instructions. To facilitate the controlled output of assembly language instructions, the language includes a string conversion operator which when associated with a variable in the program causes that variable to be output in a standard assembly language syntax for the data type of that variable.

The data types of the language include various specialized assembly language syntax elements which fall into such categories as operands, masks, and the above-mentioned instructions. Many different operand data types may be employed. For example, there may be separate data types for, e.g., integer registers, floating point registers, and constant values. To allow additional flexibility in using operand data types, the language provides for simple and compound operand data types. Compound operand data types specify combinations of two or more variables of the simple operand data type.

The "instruction" data type specifies one or more assembly language instructions. Each variable of this data type includes one or more assembly language instruction including, for example, floating point addition, call, load integer, branch on condition, etc. In general, a variable which specifies more than one instruction (or other syntax element) may be an ordered set, an array, or a tuple. Specific instructions of ordered sets, arrays, etc. may be selected by conventional regular expressions which are supported by the language. For instance, the various assembly language instructions that begin with the letter "A" may be selected from a larger group of instructions in an ordered set by the following statement:

ins[ADD, ADDC, AND, ANDN, BPcc, ... XOR]=SELECT "A.*"

Here the variable "ins" is an ordered set of various instructions such as ADD, ADDC, etc. SELECT "A.*" is a regular expression which specifies only those instructions from the ordered set which start with the letter "A."

Another data type supported by languages of this invention is a "mask" data type which specifies a particular data pattern (e.g., a 32 bit sequence). Such patterns may be used to provide a particular data pattern to a register or memory location. For example, a sequence of data patterns corresponding to floating point values in exponential format and generated with variables of data type mask may be repeatedly stored in a processor's floating point registers to test the processor's ability to handle a range of values in such format. The patterns generated in variables of the mask data type may include random bits, "walking" zeros and ones, counters, etc. as will be explained below.

Another aspect of the invention provides a system for controlling the generation of an assembly language instruction sequence. The system includes a compiler which recognizes data types specifying assembly language syntax elements (such as the data types discussed above) and compiles programs containing variables of these data types to produce an executable version of the program which can control generation of the assembly language instruction sequence. Preferably, the compiler also recognizes the other language elements such as the string conversion operator discussed above. The system includes, in addition to the compiler, a mechanism for executing an executable version of the program which was produced by the compiler. The mechanism for executing will output a desired assembly language instruction sequence.

These and other features of the present invention will be presented in more detail in the following specification of the invention and the figures.

BRIEF DESCRIPTION OF THE DRAWINGS

FIG. 2 is an illustration of a data pattern generated by a counter field of a variable of data type mask

FIG. 4 is an illustration of a data pattern including a walking zeros, walking ones, a random number generator, and a counter as produced by a variable of the mask data type;

FIG. 5 is a table illustrating the allowed conversions between collection types in accordance with a preferred embodiment of the present invention.

DESCRIPTION OF THE PREFERRED EMBODIMENTS

I. Physical Embodiment

The invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, or compiling. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

Figure 1:
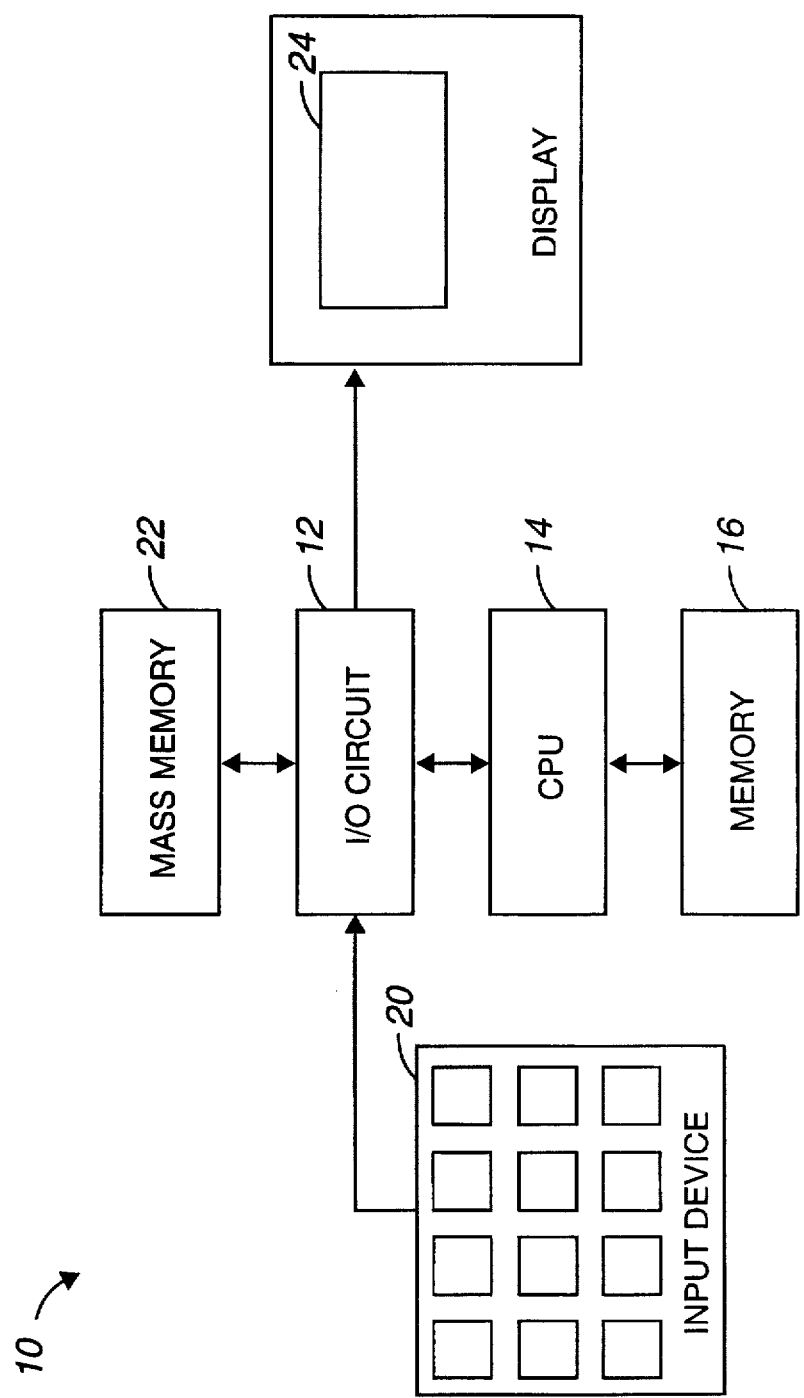
FIG. 1 is a block diagram of a computer system which may be used to generate assembly language sequences in accordance with this invention.

FIG. 1 shows a typical computer-based system according to the present invention. Shown is a computer 10 which comprises an input/output circuit 12 used to communicate information in appropriately structured form to and from the parts of computer 10 and associated equipment, a central processing unit 14, and a memory 16. These components are those typically found in most general and special purpose computers 10 and are intended to be representative of this broad category of data processors.

FIG. 1 also illustrates an input device 20 shown as a keyboard. It should be understood, however, that the input device 20 may actually be a transducer card reader, a magnetic or paper tape reader, a tablet and stylus, a voice or handwriting recognizer, or some other well-known input device such as, of course, another computer. A mass memory device 22 is coupled to the input/output circuit 12 and provides additional storage capability for the computer 10. The mass memory device 22 may be used to store programs, data and the like and may take the form of a magnetic or paper tape reader or some other well known device. It will be appreciated that the information retained within the mass memory device 22, may, in appropriate cases, be incorporated in standard fashion into computer 10 as part of the memory 16.

In additional, a display monitor 24 is illustrated which is used to display the images being generated by the present invention. Such a display monitor 24 may take the form of any of several well-known varieties of cathode ray tube displays or some other well known type of display.

As is well known, the memory 16 may store programs which represent a variety of sequences of instructions for execution by the central processing unit 14. For example, programs written in a high level language of this invention may be stored within the memory 16.

II. Overview and Exemplary Operation of the System

The following description of this invention references assembly language instructions for a microprocessor conforming to the "SPARC Version 9" architecture as set forth in "The SPARC Architecture Manual," Version 9, Weaver and Germond, Eds., PTR Prentice Hall, Englewood Cliffs, N.J. (1994), which is incorporated herein by reference for all purposes. As many of the features of the below described methods and systems require some knowledge of SPARC architecture and assembly language (which is discussed in the "The SPARC Architecture Manual, Version 9"), it is assumed that the reader is familiar with this reference. It should be understood that the present invention may be employed to generate assembly language sequences for microprocessors other than those conforming with the SPARC V9 standard.

The methods and systems of this invention employ a high level language referred to herein as a "code generation language" ("CGL"). As explained below, CGL has many functionalities in common with widely-used high level languages such as "C." When a program written in CGL is compiled and executed, an output file, such as a diagnostic file containing a sequence of assembly language instructions is outputted. These instructions may then be converted to machine code by an assembler and executed on a processor.

As used herein, the term "processor" refers to any device that processes signals in a computational environment. For example, a microprocessor, a chip set, a mother board, and even a complete computer system with a CPU, memory, etc. constitutes a "processor" within the meaning of this invention. A processor may also be used as a controller for applications outside of the computer field, e.g., for automotive, environmental, and entertainment applications. Although processors from numerous vendors can be tested according to the methods of this invention, particularly appropriate processors are the SPARC microprocessors available from Sun Microsystems of Mountain View, Calif.

A "diagnostic" or "diagnostic file"—such as a sequence of assembly language or machine instructions written in accordance with this invention and specifically designed to identify bugs in a processor under development—may be used to determine whether a processor has bugs. This is accomplished by running the diagnostic on an "architectural model" in parallel with a "processor design model." The results of these runs are compared and, if there is a discrepancy, a bug has been found. The architectural model reproduces the functional behavior of a processor and acts as a control which provides the "correct" results. It emulates the architecture of the processor including pins, registers, caches, etc. However, an architectural model is only a functional representation, and does not contain the actual logic of the processor under development.

A "processor design model" is the logical (Boolean) structural model of the processor being designed. It emulates the cycle-by-cycle (clock) behavior of the processor and includes a pipeline of instructions as found in the actual silicon processor. Processor design models are written in high level hardware design languages such as Verilog. When the design of the processor is finalized (as determined by, for example, no further bugs being located), the code for the processor design model is converted to a silicon processor. The procedures involved in this transformation include creation of a net list, creation of a physical layout, and ultimately fabrication, all of which are standard processes known in the art.

To briefly illustrate how the present invention may be used to control the generation of assembly language instruction sequences for design verification or other purposes, the following examples are provided. In each example, the program can be compiled on a preferred CGL compiler, the code for which is submitted herewith in Appendix A. Such compiler will compile the following programs, as well as many others written in accordance with this invention, and output the desired assembly language instructions. As explained in more detail below, this compiler can be executed on a standard Sun workstation.

The first program generates the following assembly language code:

add %g0, 1, %g1

This is an instruction to add (by virtue of the op code "add") two integers and store them in a register denoted by %g1. The operation adds the value "1" to the value stored in the register denoted by %g0. This format for an add instruction corresponds to the suggested assembly language syntax specified in the SPARC Architecture Manual, Version 9.

In CGL, a program to generate the above statement may be given by the following:

```
main ( )
{
$$ add %g0, 1, %g1
}
```

The statement in function "main ()" which reads—"$$ add %g0, 1, %g1"—is referred to herein as a "dollar-dollar" statement. All information including the string appearing after the "$$" up to the end of the line, together constitutes the $$ statement. The compiler transfers the content of the line after the "$$" directly to an output file by executing the statement. The same assembly language code may also be generated by the following program:

```
main ( )
{
printf("\tadd\t%g0, 1, %g1\n");
}
```

Here the $$ statement has been replaced with a "printf" formatted output statement of the type used in "C." In general, the $$ statement and the function "printf" may be used to generate any assembly language statement or comment in the manner shown above.

The next program illustrates an additional powerful feature of the $$ statement as applied to variables of data types corresponding to assembly language syntax elements. This specific program generates assembly language instructions to initialize all integer registers of a SPARC chip. The program code is given as follows:

```
// code to initialize all integer registers
reg r1;
main ( )
{
    // initialize all integer reg
```

```
    for (r1=1; r1<32; r1++)
    $$    add %g0, 0, @r1        !initialize reg @r1
    }
```

The first line "// code to initialize all integer registers" is a comment line, which in this case explains briefly what the program does. Any character from "//" to the end of the line is ignored by the compiler. The next line, "reg r1" is a variable declaration. In CGL, all variables must be declared before use. A declaration consists of a data type and a list of variables of that type. Here the data type "reg" implies that the variable is treated as an integer register (i.e., one type of operand).

The first line of the main function is a "for loop" which controls repeated execution of the statement
$$ add %g0, 0, @r1!initialize reg %g1
Each time this statement is executed, the next successive register initialization instruction (one for each integer register) is generated in the same way. The "for loop" behaves in same manner as a conventional for loop provided in high level languages such as "C," and therefore will not be explained in detail here (see for example Kernighan and Ritchie, "The C Programming Language" Prentice-Hall, 1988, which is incorporated herein by reference for all purposes).

The $$ statement in the for loop contains the add instruction (which operates as described above) with an operand specified by the variable "r1." This variable is preceded by a "string conversion operator" given by "@."The string conversion operator, when used in a $$ statement, converts the variable r1 to its current value in appropriate assembly language syntax. Thus, if the current value of the variable r1 is 5, as dictated by the for loop, then the operand "%g5" will be output for the string @r1 in an add instruction. If the variable r1 was declared to be of data type "freg" (the data type for a floating point register) rather than "reg," then the operand "%f5" would be output in response to a $$ statement including @r1. Thus, the string conversion operator can cause the compiler to output different operands (or other assembly language syntax elements) depending upon the data type of the variable in the $$ statement.

The assembly language code generated by the above program is given as follows:

```
    /
        add %g0, 0, %g1 ! initialize reg %g1
        ... ... ...
        add %g0, 0, %i6 ! initialize reg %i6
        add %g0, 0, %i7 ! initialize reg %i7
    !   Generated: 32Lines
    ! END of Test
```

In first iteration, r1=1, so the converted string is "%g1"; and in the last iteration r1 is 31 and the converted string is "%i7". As specified in the SPARC architecture standard, Version 9, a SPARC chip include 32 nonprivileged integer registers numbered in the following sequence; g0–g7, o0–o7, l0–l7, and i0–i7. In this sequence, "g" specifies global registers, "o" specifies out registers, "l" specifies local registers, and "i" specifies in registers.

The next example illustrates how the invention can handle regular expressions to select specified instructions from an ordered set of assembly language instructions. As noted, variables of the data type "instruction" define various assembly language instructions. When such variables are declared, they may be initialized by a regular expression. As is known in the art, regular expressions allow selection of specified elements from ordered sets. The following declaration statements exemplify how specific variables (of the instruction data type) may be initialized by a regular expression.

```
    inst    ins = select "B[a-zA-Z,]*";
    inst    ins_os[ ] = select "B[a-zA-Z,]*";
    }
```

Both statements include select "B[a-zA-Z,]*" which defines the set of all instructions identified as having a first letter "B," a second letter given by any member of the alphabet, and any subsequent letters as indicated by the wild card ("*") symbol. In the SPARC V9 assembly language, instructions meeting these criteria include, for example, all branch instructions.

The first statement above defines the variable "ins" as a scalar variable of the instruction data type. Because "ins" is a scalar variable, it can have only one value at a given time. In CGL, scalar variables such as ins which are defined by regular expressions will be initialized by the first item of the selected instruction set. Thus, if the assembly language instruction BRZ (branch on register zero) is the first instruction meeting the criteria of the regular instruction, then ins will be initialized to BRZ.

A CGL variable may be an "ordered set" as opposed to a scalar. In the above example, the variable "ins_os" is defined as an ordered set. As such, it will be initialized by the entire selected instruction set, and therefore will include more than one instruction (e.g., BRZ, BRLEZ, BRLZ, etc.). The use of ordered sets, arrays, and other multi-member entities in CGL will be discussed in more detail below.

III. Data Types Specifying Assembly Language Syntax Elements

A data type defines the set of values that a variable may assume, and every variable in a program must be associated with one and only one data type. In preferred versions of CGL, unique data types that are particularly applicable to the generation of assembly language code are broadly classified into the following categories: (1) operand (simple and compound), (2) mask, and (3) instruction. Other data types such as "integer," "string," "file," "double precision," etc. used in conventional languages such as "C," Pascal, and FORTRAN may also be used in CGL. These "conventional" data types may be used to control flow, do calculations, etc. as necessary in a CGL program.

One other data type worth mentioning is a "tuple." Tuples represent collections of elements (more than one) that may come from various sets. For example, a three element tuple might contain one element selected from the 26 letters of the English alphabet, a second element selected from the numbers 1 to 100, and a third element selected from values $1 to $50. As seen from this example, the element types of the tuple may be arbitrary, being specified as members of various sets. The individual members of a given tuple may be selected by the expressions used to define members of an array or an ordered set. Both arrays and ordered sets are discussed below in the section entitled "Collection Types of Variables."

A. Operand Data Types

All assembly language instructions include an op code portion which defines the function performed by the instruction. Many of these instructions also include one or more "operands" which provide immediate data to be operated on or addresses where such data can be found. In general, an instruction may include no operands, one operand, two operands, or three operands depending upon the op code.

The various operands used in an assembly language are generally specific for a certain instruction or class of instructions. For example, the immediate value disp22 (an operand) defines a 22 bit field used in certain SPARC V9 branch instructions to specify the number of assembly language instructions to be offset in the branch. The signed immediate value simm13 (another operand) defines a 13 bit field used in SPARC V9 arithmetic instructions.

Variables declared to be operands are to be replaced (in an output file) with numeric or symbolic values in the actual assembly language code. For example, in SPARC V9 code, a variable of type "imm_asi" would be replaced by a number in the range of 0 to 255 (because it is provided as an 8 bit field in the corresponding machine instruction). Further, a variable of type "freg" would be replaced by one of the values %f0, %f1, %f2, . . . %f63 which specify floating point registers where numeric values may be stored.

All of the following operand data types are defined in the "The SPARC Architecture Manual, Version 9," previously incorporated by reference. A listing of the various operands and their use in assembly language instructions is provided in Chapter 6 of that reference.

"reg"—This corresponds to an integer register number. It can have values from 0–31 corresponding to the 32 non-privileged integer registers in a SPARC microprocessor conforming to the V9 standard. A variable declared to be of "reg" data type, can be used in a program such that the output file generated upon executing the program contains the correct assembly language syntax for the current value of the variable. For example, when the current value of a reg type variable is 13, it will be outputted as r[13] or %o5, when the value is 31, the output will be r[31] or %i7, and when the value is 1, the output will be r[1] or %g1.

"freg"—This corresponds to a floating point register number, and it can have values form 0–63. In single precision freg generation, CGL generates %f<number> where <number> is the contents of this variable mod 31. In double precision, it generates %d<lower-nearest-double-number>, and in quad precision, it generates %q<lower-nearest-quad-number>.

"asr_reg"—This corresponds to the number of an Ancillary State Register, and it can have any value from 16 to 31. These registers are available, in SPARC-V9, for implementation-dependent uses such as timers, counters, diagnostic registers, self-test registers, and trap-control registers. These registers may be privileged or unprivileged.

"i_or_x_cc"—This corresponds to a set of integer condition codes to be used in an instruction. Some integer arithmetic instructions set the integer condition codes (icc and xcc) as a side effect. The integer condition code operand is then used to specify whether a condition has been met in instructions such as Branch on Integer Condition Codes with Prediction (BPcc), Move Integer Register if condition is satisfied (FMOVcc), or Trap on Integer Condition Codes (Tcc). CGL allows the programmer to directly control generation of this operand as follows:
0: %icc
1: %xcc For example, when the current value of an i_or_x_cc type variable is 1, it will be outputted as %xcc and when the value is 0, the output will be %icc.

"fccN"—This corresponds to a set of floating point condition codes. It can have values 0–3. CGL allows the programmer to directly control generation of this operand as follows:
0: %fcc0
1: %fcc1
2: %fcc2
3: %fcc3

These operands are used to specify whether a condition has been met in much the same manner as the integer condition codes, but with instructions for floating point arithmetic.

"imm_asi"—This corresponds to an 8-bit field which is the address space identifier in instructions which access alternate space. The ASI identifier used by such instructions is specified in an ASI register. The address space identifier identifies the byte order of the access as explained in "The SPARC Architecture Manual, Version 9."

"simm7," "simm10," "simm11," and "simm13"—These correspond to signed immediate constants that can be represented by 7 bits, 10 bits, 11 bits, and 13 bits, respectively. For example, simm13 can have values of –4096 to 4095. These operands are used in "move integer register" instructions, arithmetic instructions, and certain load/store instructions.

"disp19," "disp22," and "disp30"—The first two of these correspond to a 19 and 22 bit values specifying the offsets (in numbers of instructions) for certain branch instructions. "disp30" corresponds to a 30 bit value specifying the offset for a CALL instruction. The values of these operands are used to determine of the program counters ("PCs") of destination instructions, typically by multiplying by 4 and adding the result to the current instruction PC.

"shcnt32" and "shcnt64"—These operands provide a 5-bit field for the shift count of 32-bit instructions, and a 6-bit field for the shift count of 64-bit instructions, respectively. Thus, depending on a condition set in a shift instruction, the shift count is specified by bits 0–4 of the shcnt32 operand of the instruction or bits 0–5 of the shcnt64 operand of the instruction.

"value"—This operand can represent any 64 bit value.

Special symbol names—Certain symbols must appear in the SPARC V9 assembly language instruction exactly as they appear below. The symbol names and the registers or operators to which they refer are included.

| | |
|---|---|
| %asi | Alternate Space Identifier register |
| %canrestore | Restorable Windows register |
| %cansave | Savable Window register |
| %cleanwin | Clean Window register |
| %cwp | Current Window Pointer register |
| %fq | Floating-point Queue |
| %fsr | Floating-point State register |
| %otherwin | Other Windows register |
| %pc | Program Counter register |
| %pil | Processor Interrupt Level register |
| %pstate | Processor State register |
| %tba | Trap Base Address register |
| %tick | tick (cycle count) register |
| %tl | Trap Lervel register |
| %tnpc | Trap Next Program Counter register |
| %tpc | Trap Program Counter register |
| %tstate | Trap State register |
| %tt | Trap Type register |
| %ccr | Condition Code register |
| %fprs | Floating-Point Registers State register |
| %ver | Version register |
| %wstate | Window State register |
| %y | Y register |

In addition to the above-listed registers, this invention provides one or more "performance registers" which tally certain performance criteria associated with running a program in assembly language code. Such criteria include for example an average number of cycles per instruction, a cache hit rate, a number of mispredicted branches taken, etc. Such criteria are especially useful in assembly language programs which act as diagnostics during design verification.

"label"—This specifies a "compound" operand having two components: name and offset (e.g., disp22). It should be understood that a simple data type specifies only one data value at a time, while a compound data type specifies a collection of simple or compound members or variables (like a structure in 'C'). A variable of type "label" may include a sequence of characters such as alphabetic letters, underscores (_), periods, decimal digits, etc.

"reg_plus_imm"—This compound data type has two components: reg and simm13. The appropriate assembly language syntax is provided at pg. 287 of "The SPARC Architecture Manual, Version 9." To declare a variable of this data type, other variables of the appropriate simple data types must first be declared. For example, the following declarations may be employed to initialize a variable of reg_plus_imm data type:
reg r1
simm13 simm1=4
reg_plus_imm rimm={r1, imm}

"regaddr"—This compound data type has two components: reg1 and reg2 (both are of data type "reg"). Again, the appropriate assembly language syntax is provided at pg. 267 of "The SPARC Architecture Manual, Version 9."

Still other compound data types are set forth at pp. 287–288 of The SPARC Architecture Manual, Version 9.

B. Mask Data Types

Mask data types are used to generate specific bit patterns in assembly language instructions. Such patterns may be used to initialize memory locations with specific patterns or provide operands for certain floating point instructions, for example. Memory locations or floating point operands may be divided into a number of fields. Each bit of a field may be masked with a specific type of mask to control the values in that field. To accomplish this, a variable is initially declared as a mask data type (the variations of which are discussed below). Thereafter when that variable is used with the appropriate constructs in a CGL program, data patterns specified by the mask variable are generated in the assembly language output code.

In preferred embodiments, the following mask pattern characters are supported:
0's in the mask field-force the value 0 to appear there
1's in the mask field-force the value 1 to appear there
c's in the mask field-provide a wrap around counter
A-Z's in the mask field provide a wrap around collated counter
z's in the mask field provide a region for walking 0's
o's in the mask field provide a region for walking 1's
r's in the mask field provide a random field Each of these will now be described in more detail.

Char '0' or '1'—These characters force the corresponding bits to a specified value, either 0 or 1.

Char 'c'—This character is used as part of a counter field. Consecutive "c"s create a field which acts as a counter. Each time a mask type variable having such field is referenced, the system generates a new bit pattern (from the mask) which increases the counter by 1. When the maximum value is reached (overflow caused by 1's at every position in the field), CGL forces wrap around. In a preferred embodiment, the maximum size of a counter field is 32 bits.

FIG. 2 shows how a mask type variable having counter field would control the generation of bit patterns in assembly language instructions. A mask region 50 is defined when a variable of type mask is initialized to include a counter field having five counters. The remainder of mask region 50 may have other mask characters as will be described below. The first time that an assembly language instruction is generated from the variable, the pattern shown immediately below the counter field in FIG. 2 (position 1) will be generated. The second time, the pattern shown at position 2 will be generated. Thereafter as shown, the counter increases the binary value in the counter field by one each time a new instruction is generated from the mask variable.

Figure 3:
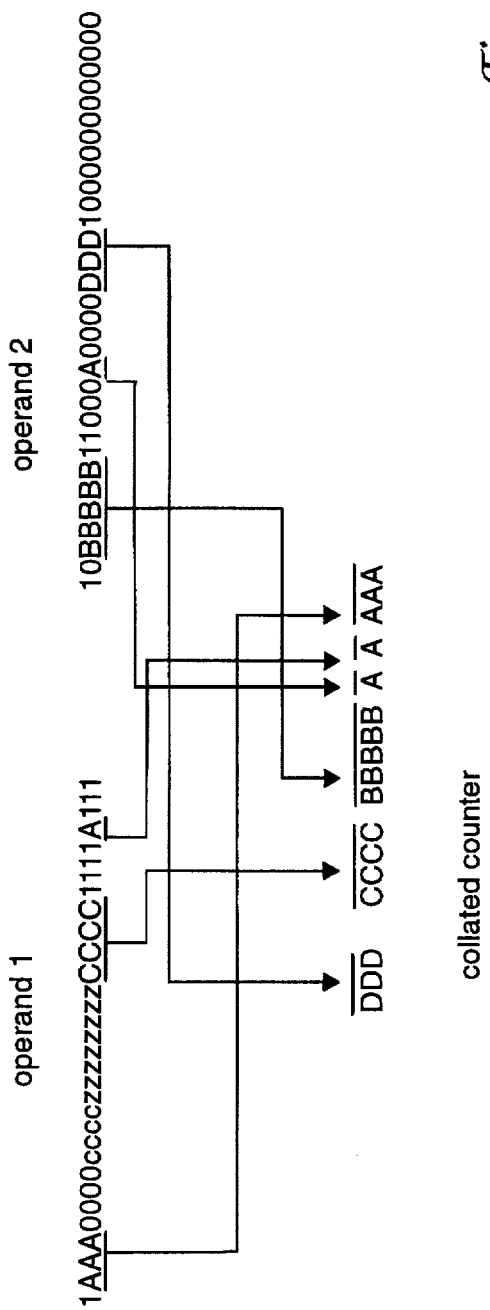
FIGS. 3a and 3b are illustrations of data patterns showing how a collated counter is used to produce a composite counter field from two variables of data type mask.

Char 'A'–'Z'—These characters may be used to produce a collated counter field (which operates in a manner similar to that specified the standard counter fields specified by the 'c' characters) by concatenating fields designated by mask characters A–Z from one or more variables of the mask data type. FIGS. 3A and 3B illustrate how this is accomplished for a combination of two variables of data type mask. The bit order of the field is determined with respect to the order of characters.

As shown in FIG. 3A, the order of the characters in the collated counter field is governed by two features: (1) the specific alphabetic letter in the field, and (2) the relative locations of those letter in the variable or variables. As shown, the variable fields containing "A" are entered in the collated counter first, the variable fields containing the letter "B" are entered next, and so on. The letters in the first variable are entered first, the same letters in the second variable are entered second, and so on.

FIG. 3B illustrates this ordering another way. The counter numbers located under the mask variables indicate the relative location of each counter position in the collated counter. For example, the relative location of the counters specified by the letters B are 06, 07, 08. 09, and 10. Each time that CGL uses the collated counter, it is incremented by one. Like the counter fields produced with the character "c," the total length of the counter field is preferably limited to 32 bits.

Char 'z'—This character is used as part of a field for walking zeros. Consecutive 'z's create a field in an instruction operand which is filled by 1's and a single 0 which moves from right to left direction circularly on each generation of data.

Char 'o'—This character is used as part of a field of walking ones. Consecutive 'o's create a field in an instruction operand which is filled by 0's and a single 1 which moves from right to left direction circularly on each generation of the data.

Char 'r'—This character is used as part of a field which generates random numbers. Consecutive 'r's create a field in an instruction operand which is used to generate a random bit-string.

MASK_32, MASK_64, and MASK_28—These are the data types which declare variables having fields (of 32 bits, 64 bits, and 128 bits, respectively) for patterns of mask characters. FIG. 4 illustrates the use of a mask type variable initialized with different types of fields. Line 60 illustrates the statement used to declare and initialize a variable "msk" of type "MASK_32" and having counter, random, walking zero, and walking one fields. The "#" in line 60 specifies that the character sequence following that symbol defines a mask. The mask 62 is used to generate successive bit patterns shown below the mask. The first seven positions of msk are fixed values having the pattern 1110001. The next three positions define a counter field. After that, the next four positions define a random number field. The next three positions define a walking zero field and the final five positions define a walking one field. The positions below each of these fields illustrate how the bit patterns evolve for successive data generation steps.

As a further example, a variable of type MASK_32 is used to test the ability of processors various floating point registers to handle all possible 8 bit exponents of single precision floating point values in exponential form. Such floating point values generally have a 23 bit mantissa, an 8 bit exponent, and a single bit "sign" specifying a positive or negative value. The mask pattern for such a floating point value my take the following form:

MASK_32 msk=#icccccccccrrr . . . r here the "1" controls the sign, the "c"s defines an 8 bit counter field for the exponent, and the remaining "r"s define 23 bit field for the mantissa. This allows a programmer to test whether each exponent is working in an instruction accessing single precision floating pointing values.

To generate all possible exponent values, the variable "msk" might be included in a loop controlled by, for example, the following instruction:

```
MASK_32 msk=#1cccccccccrrr . . . r
freg frl
main ( )
{
    for (frl=0; frl<255; frl++)
    $$      fadd %f0, @msk++, @frl
}
```

C. The Instruction Data Type

The instruction data type may specify any one or more of a collection of instructions that make up an assembly language. In general, this data type specifies not only the op code for a given instruction, but other characteristics of the instruction such as certain machine code fields that are unique to the instruction. Code using variables of this type may be used for various purposes including providing specific instructions to the output file and filtering collections of instructions to identify subsets of interest for certain applications.

Declaring a variable "ins" to be of type instruction ("instr") may be accomplished by the following expression:
instr ins="ADD";

"ADD" specifies the assembly language op code for a conventional add instruction and "instr" specifies that the variable "ins" is of the instruction data type.

Regular expressions may be employed to filter the complete set of assembly language instructions for a given microprocessor. The following examples serve to illustrate a few of the uses of regular expressions and instruction type variables.
inst ins1[]=select "A.*";

This expression which includes the wildcard "*" which represents any available symbol. In this case, the regular expression selects all assembly language instructions which begin with the letter "A." This would include, for example, all integer addition instructions in the SPARC V9 assembly language (e.g., ADD, ADDc, ADDcc, etc.). Thus, the variable ins1[] will be an ordered set of all such instructions.

The next expression illustrates the use of an "or" in a regular expression.
inst ins2[]=select "LD.*|ST.*";

Here the "I" symbol indicates that those assembly language instructions starting with LD or ST should be included in the ordered set for the variable ins2[]. Thus, ins2[] will include load and store instructions.

Finally, the use of a bracketed range of values will be illustrated by the following expression:
inst ins3[]=select "LD[DQ]F";

This expression will cause ins3[] to include two values: LDDF and LDQF.

The following statements illustrate how variables of the instruction data type may return detailed information about specific instructions. An assembly language instruction includes various attributes associated with both its assembly language form and its machine language form. In preferred embodiments, the present invention provides CGL functions which return many of these various attributes.

First, for an instruction type variable "ins," the expression "ins.opcode" or "opcode(ins)" will cause the assembly language op code to be returned. For example, if the variable ins was previously set to the scalar value "ADD," the expression ins.opcode will return a value of "ADD."

Next, the expression "_.asmop" will return an assembly language instruction in the form that can be used by an assembler. For example, the expression ins.asmop will return "add."

Other functions may be employed to select instructions based upon criteria specific to assembly language instructions. Two such functions will now be described. The machine language instructions associated with assembly language instructions have various fields which include a sequence of bits. For SPARC V9 assembly language instructions, the corresponding machine code fields are set for in Appendix A of "The SPARC Architecture Manual, Version 9" which was previously incorporated herein by reference. Some such fields specify registers or immediate values. Other fields, which are of special interest here, specify the particular op code of the assembly language instruction that they represent. In many SPARC V9 machine instructions, a two bit field "op" together with a six bit field "op3" specify the opcode. In other instructions, some other fields may specify the opcode. For an ADD instruction for example, the op field is given by the sequence 10 and the Op3 field is given by the sequence 00 0000. If the variable ins is set equal to ADD, the expression "ins.op" (or "op(ins)") will return the value 10, and the expression "ins.op3" (or "op3(ins)") will return the value 00 0000. Other assembly language instructions will, of course, return unique combinations of op and op3. Some groups of related instructions have a certain field in common, e.g., the op field. In such cases, the op and op3 expressions are useful to filter various instructions contained in an ordered set or array variable. For example, a regular expression may require that a variable be limited to only those instructions that return a value of 10in response to "ins.op."

D. Variables Containing Collections of Elements

Every variable must fall in one of the following collection types: (1) scalar, (2) ordered set, or (3) array. These are not data types, but are categories of variable, largely independent of data type. Scalar variables contain a single element, while ordered sets and arrays contain multiple elements. The general distinction between ordered sets and arrays is the mechanism by which the members of these collection types are accessed. In the implementation of CGL provided in the Appendix, variables of the instruction and operand data types may be scalar, an ordered set, or an array. Variables of the mask data type may only be scalar. Further, variables may be assigned from one collection type to another as shown in FIG. 5. This is accomplished with an assignment operator such as "=" as discussed below. Note that, in general, assignments are allowed only between variables of the same data type. Also note that when an array is assigned to a scalar, a scalar element will be randomly selected from the array. Further, when a tuple is assigned to a variable of another collection type, it must be indexed. For example, if a variable of type tuple is defined as "tuple tu=(a,b,c)", then a scalar variable x (of the same type as the tuple elements) will take on a value of "a" from the assignment x=tu[0], a value of "b" from the assignment x=tu[1], etc.

A variable is designated as an ordered set, an array, or a scalar when it is declared. In the embodiment provided by the compiler included in the Appendix, an ordered set is designated by a set of the brackets "[]." Thus, the declaration "reg r1[]" specifies that the variable r1[] is an ordered set of data type register. The declaration "reg r1 []=[2, 5, 7, 9, 11]" specifies that the ordered set includes the five listed members. Any time that r1[] is included in CCL code, it references those five elements, unless the values in r1[] are first filtered as described below. In the embodiment of the Appendix, an array is designated by a set of the brackets "{}." Thus, the declaration "reg r2{5}={2, 3, 4, 5, 6}" specifies that the array includes the five listed members, and code containing r2 then references all five members. Finally, a scalar is designated by simply declaring a variable without including any brackets.

An ordered set includes an internal pointer which is always set to one and only one of the set members. The members may be accessed by various pointer movement functions such "first" which references the first member of the ordered set, "next" which references the next successive member of the set, "previous" which references the immediately previous member of the set, and "last" which references the last member of the set. Thus, if an ordered set is declared as "reg r1[]=[2, 5, 7, 9, 11]," the above functions work as follows. The code "rtemp=first(r1)" will set the value of rtemp equal to 2. Thereafter, the code "rtemp=next (r1)" will set the value of rtemp equal to 5. If instead, the code "rtemp=prev(r1)" had been used, the system would have set rtemp equal to 11. Of course, the returned values of "next" and "prev" depend upon the current location of the internal pointer. If the internal pointer was at the fourth location (i.e., at the value 9), then "next" function would return 11, and the "prev" function would return 7. No matter where the current pointer is located, the "first" function will return it to the first location, e.g., 2 in this case. Likewise, the "last" function will place the pointer at the last location, e.g., 11 in this case.

The current location of the pointer in an ordered set can be queried with the functions "bos" and "eos." If the pointer is currently located at the beginning of the set, then the system returns True (1) in response to bos ("beginning of set"). If the pointer is located anywhere else, False (0) is returned. If the pointer is currently located at the end of the set, then the system returns True (1) in response to eos ("end of set"). If the pointer is located anywhere else, False (0) is returned.

Array elements may be accessed in a different manner. Specifically, they may be directly accessed by referencing their positions within the array. For example, if an array is declared by "reg r2{5}={2, 3, 4, 5, 6 }," then the instruction "rtemp=r2[3]" will give the variable rtemp a value of 4 (the third member of the array). It should be noted that in the embodiment of this invention provided in the Appendix, an array is declared with "{}" while it is accessed with "[]." Likewise, an ordered set is declared with "[]" but may be accessed with "{}."

As noted above, a tuple is a data type that may contain multiple elements. In preferred embodiment, the members of a tuple may be accessed as either an array or an ordered set. Thus, if a tuple is declared as "tuple tu =("a", "b", "c", "d", "e")," the function "first(tu)" will return a value of "a," and the function tu[3] will return a value of "c." It should be noted that the elements of a tuple may take many different forms including strings, instructions, integers, etc.

IV. Language Elements

Various functions have been developed to filter collections of assembly language instructions based upon certain features of the instructions. Four of these expressions will now be discussed.

First, a function referred to as the "class" function selects instructions based upon how they are treated in a superscalar microprocessor architecture. As known to those of skill in the art, superscalar microprocessors can dispatch multiple instructions in a single clock cycle. The number of such instructions dispatched is limited by "grouping rules" specifying that certain combinations of instructions can not be dispatched simultaneously. These rules are architecture dependent and rely on, for example, the available resources of a microprocessor. In a superSPARC microprocessor (available from Sun Microsystems, Inc.), for example, there are separate arithmetic logic units: including ALU0 and ALU1. Each ALU can handle only one instruction (or a limited number of instructions) per clock cycle. Thus, two ALU instructions can not be dispatched at the same time.

The class function, will filter instructions based upon the microprocessor element that handles them. For example, in the embodiment supported by the compiler in the Appendix of this application, one class of instruction is the ALU0 class. When any member of this class of instructions is evaluated by class, CGL will return "ALU0." Obviously, the instructions in a given class will depend upon the architecture—and specifically the available resources of that architecture—in a superscalar microprocessor. The request takes the following form:

<value>class(<instr-type-variable>)

For example, the following assignment may be used: "cls=class (ins)." If the variable "ins" is a scalar instruction type, the function class returns the instruction class of single instruction represented by ins. If, however, ins is an ordered-set, class returns the instruction class of the current item in the ordered set.

Next, a function known as the "type" function specifies a generic type for each specific instruction tested. Instructions may be divided into types based on common functional features. In the embodiment of CGL supported in the Appendix, the following types are provided: integer type instructions, branch type instructions, load type instructions, store type instructions, float type instructions, graphics type instructions, and miscellaneous type instructions. Other type groupings are, of course possible. The request takes the following form:

<value>type(<instr-type-variable>)

For example, the following assignment may be used: "ins_type=type(ins)." If the variable "ins" is a scalar instruction type, the function type returns the instruction type of single instruction represented by ins. If, however, ins is an ordered-set, type returns the instruction type of the current item in the ordered set.

The type function may be used to test for a particular instruction type as in the following expression: "if (type(ins) ==TYPE_INT) . . . . " This expression will be true only if the variable ins is currently set to an integer type instruction. Values returned by the version of CGL in the appendix are the following:

| Value | Meaning |
| --- | --- |
| CGL_TYPE_INT | Integer type Instruction |
| CGL_TYPE_BRANCH | Branch type Instruction |
| CGL_TYPE_LOAD | Load type Instruction |
| CGL_TYPE_STORE | Store type Instruction |
| CGL_TYPE_FLOAT | Float type Instruction |
| CGL_TYPE_GRAPHIC | Graphic type Instruction |
| CGL_TYPE_MISC | Miscellaneous type Instruction |

Another function "is_op1" allows selection of instructions based upon their first operand. More specifically, this function filters instructions by eliminating those instruction which do not have a specified combination of op code and first operand. The syntax is as follows:

is_op1(<ins>, <operand-name>);

where <ins> is a variable of type instr and <operand-name> is an operand type for any assembly language instruction.

For the SPARC V9 assembly language, the operand names can be found in "The SPARC Architecture Manual, Version 9."

The operation of "is_op1" is illustrated by the following example. The variable ins[] is an ordered set including as 5 elements an add instruction and a branch instruction. The expression "is_op1 (ins, reg)" will return "true" only for the add instruction because add instructions have registers as their first operands. Branch instructions, on the other hand, do not have registers as their first operands. Therefore, the above expression will return "false" for the branch instruction. Related functions "is_op2" and "is_op3" operate in an identical manner with respect to and instruction's second and third operands, respectively.

Yet another function "fld" returns the binary value of various fields in a machine language counterpart of an assembly language instruction. The expression may be used, for example, to return the binary value of the "op" field of an ADD instruction. The syntax for the field instruction is as follows:

<value>fld(<instr>, <fld-name>);

where <ins> is a variable of type instr and <fld-name> may be any field of any listed instruction in an assembly language. For SPARC V9 instructions, whose fields are specified in Appendix A of "The SPARC Architecture Manual, Version 9" (previously incorporated by reference). Examples include op, op2, opf, rd, simm13, cond, etc. An exemplary use of the "fld" instruction in the SPARC V9 assembly language is provided as follows. There are two types of integer ADD instruction, one specifying three registers (in the form ADD reg, reg, reg) and an other specifying two registers and an immediate value (in the form ADD reg, imm, reg). In the machine code for these two types of instruction, the 1 bit field "i" is set to 0 for first type of integer ADD and to 1 for the second type of integer ADD. These two ADD instructions could be distinguished by a condition such as following: "If (fld(ins, FLD.I)==) . . .." This condition would be met for only the first type of integer ADD instruction.

A language of the present invention should provide one or more functions for outputting arguments to a standard output file. In an embodiment provided by the appended compiler, three functions for outputting an argument with CGL are the "$$" expression, the "printf" function, the "generate" function. The first two of these functions can handle string arguments as well as expression arguments. The last function (generate) is specific for arguments with are instruction type variables.

The printf function in CGL converts, formats and then transfers an argument to a standard output file. It functions analogously to the printf output statement used in the "C" programming language. An argument will be automatically converted to a character string, but the conversion depends on the type of the argument. The following example illustrates some properties of the printf function in CGL.

```
reg          rl = 6;
freg         frl = 4;
simm13       imm = 255;
value        val = 255;
MASK_32      mskl = # rrrr rrrr rrrr rrrr rrrr rrrr rrrr rrrr;
...
...
...
printf("%s\n",rl);      // prints - %g6
printf("%s\n",frl);     // prints - %f4
printf("%s\n",imm);     // prints - 0xff
```

-continued

```
printf("%s\n",val);     // prints - 255
printf("%s\n",mskl);    // prints - 0x682ca72
```

An example of an expression argument employed to initialize all integer registers of a processor is given by the following code:

printf ("\tadd\t%g0, 0, ", r1++, "\t initialize reg", r1, "\n")

The $$ statement also directs arguments to a standard output file. Specifically, any string following the $$ symbol, up to the end of the line on which the $$ appears, is transferred to a standard output file. When the $$ function is used in conjunction with the string conversion operator "@," any variable following the @ symbol—up to the next space, comma, or tab—is converted to an appropriate output string depending upon the variable type. That is, the character @ in a $$ argument string identifies that the following string up to a space, comma or tab is a variable name. CGL converts the value of this variable to the character string, and then transfers it to the output stream. Thus, if the current value of a register type variable r1 is 5, then CGL produces %g5 for the string @r1. If r1 is of type freg (the data type for a floating point register), then @r1 produces %f5. The following simple example makes this explicit:

reg r=5
$$ add @r, @r, @r
This will output
add %g5, %g5, %g5

The @ string conversion operator can also be used in expressions as illustrated in the following example.
reg r=1
reg r1=2
$$ add @r, @r, @(r1++)
This statement will output
add %g1, %g1, %g2
Thereafter, when the "$$ add @r, @r, @(r1++)" statement is next executed, the output will be "add %g1, %g1, %g3"

Further, to create 8 nop instructions, the following code might be employed:
count=0;
while (count<8)
$$ nop !@count An example of code employing a string argument to initialize all integer registers of a processor is given by the following code:

```
// code to initialize all integer registers
reg rl
main( )
{
    // initialize all integer reg
    for (rl=1; rl <32; rl++)
    $$      add %g0, 0, @rl
}
```

Some variations of the @ string conversion operator allow programmers to enforce particular formats that might be available for a given argument. For example, if an argument is to be output in a hexadecimal notation, the following string conversion operator can be used: "@hex (arg)." Other enforced formats include decimal notation (@dec(arg)), octal notation (@oct(arg)), and binary notation (@bin(arg)). Further, the output of floating point arguments can forced into a particular degree of precision with the following string conversion operators: "@single(arg)" for single precision output, "@double(arg)" for double precision output, and "@quad(arg)" for quad precision output.

The third function for generating output to a standard output file is the generate function. Use of this function introduces some flexibility in controlling the output of instructions that may have different numbers and types of operands. The behavior of the generate function may be understood by first presenting an example of how the $$ function may be used. Assume that the variable "ins" is an ordered set of the data type instruction. Then the statement "$$ @ins @v1, @v2, @v3" can only be used for outputting instructions that have three operands. As noted, assembly language instructions (at least SPARC V9 instructions) may have no operands, one operand, two operands, or three operands. Thus, in order to use the above $$ statement, the variable ins would first have to be filtered to obtain an ordered set having only those instructions that require three operands. This is not a particularly easy task. Further, ins would have to be filtered to contain only those instructions which employ operands of the same data types as v1, v2, and v3.

The generate function is more flexible in that a single generate statement having an instruction type variable as its argument can output instructions which may have one, two, three, or no operands. Further, when a single generate statement is also used with "operand" type arguments, it can output instructions which require different operand types. Thus, a generate statement in a loop can convenient output many different types of instruction.

The syntax for the generate statement is as follows:
generate instr<opr1, opr2, opr3>
Here "instr" is a variable of the instruction data type, and "opr1," "opr2," and "opr 3" are variables of one or more operand data types. The generate statement is most powerful when the opr1, opr2, and opr3 are of the operand data type. Variables of this type are ordered sets of multiple different types of operand data types. For example an operand data type may include immediate value operands, integer register operands, floating point register operands, etc. This can be better understood with reference to the following example.

```
operand      xopr1 = [imm, reg, freg, . . .]
operand      xopr2 = [imm, reg, freg, . . . ]
operand      xopr3 = [imm, reg, freg, . . . ]
instr        ins = []
...
...
...
generate ins <xopr1, xopr2, xopr3>
```

Each time the statement "generate ins <xopr1, xopr2, xopr3>" is executed, the system will first take an operand from xopr1 of the type that is necessary for the current instruction (which is a member of ins[]) and place it in the first operand field, assuming that at least one operand is required for the current value of ins. If the current instruction is of a type that has no operands (e.g., a nop instruction), then the generate function will simply output that instruction without an operand. After the first operand, if any, has been selected, the system will take a second operand from xopr2 of the type required for the second operand field of the current instruction, again assuming that the instruction requires at least two operands. The third operand is selected and provided in a similar manner, this time from the xopr3 variable. It should be noted that the within a loop, the values of the operands in the "xop" variables can be changed.

A fourth function for outputting specific material is the "asmop" function discussed above. As noted, a variable of data type instruction ("ins" in this example) may be output as an instruction with the expression ins.asmop or equivalently asmop(ins).

In preferred embodiments, CGL will have many language elements that are standard in other languages (and particularly the "C" programming language). For example, the embodiment provided in the Appendix accepts numbers (in decimal or hexadecimal format), strings (which can be provided as regular expressions as described above), comments, etc. Comments may be inserted anywhere in the program, and are delimited by the symbols \\ at the end of a line.

In preferred embodiments of CGL, all variables must be declared before use. A declaration consists of a "type" and a list of variables of that type. For example, the declaration "reg r1" specifies that the variable r1 is of data type reg, i.e., the variable is listed as a register. A declared variable may also be either a scalar, array, or ordered set, and it may be initialized at the time of declaration. Consider the following variable declaration:
freg xfr1=2, xfr2, xfr_os1[], xfr_os2[]={1, 4, 6}
Here xfr1 is a scalar variable of type freg which is initialized by 2, xfr2 is an uninitialized scalar variable, xfr_os1[] is an uninitialized ordered set, and xfr_os2[] is an ordered set initialized by the set {1, 4, 6}.

In the case of a compound operand data type, two or more previously declared variables must be specified to initialize a compound variable. Here is an example of the initialization:
reg xr1=4;
simm13 xsimm13=0x2f;
reg_plus_imm xrm3={xr1, xsimm13};

The appended version of CGL supports 32 bit, 64 bit, and 128 bit mask data types. In each case, the declared variable must be scalar. Variables of the 32 bit mask data type may be declared as in the following examples:
MASK_32 msk1, msk2;
MASK_32 msk3=#rrrrcccc oooo zzzz 1111 0000 AAAA BBBB;
MASK_32 msk4={#0000 1111 ccccc rrrr zzzz oooo rrrr cccc};

In these examples, "#" indicates that the 32 successive characters define the mask pattern.

Variables of the instruction data type may be declared and initialized according to the following format:
instr <identifier>[]=select<string>
Here <string> represents any regular expression. Thus, the declaration/initialization might take the following form:
instr all_instr[]=select "[a-zA-Z0-9,]*";

Expressions commonly used in other languages may also be used with the present invention. For example, the operators available in the C language are also available in CGL. Such operators are discussed in Chapter 2 of the "The C Programming Language" previously incorporated herein by reference. These include the following unary operators:

| -          | !            | ~(one's complement) |
| ++ (increment) |          | --(decrement)       |

They also include the following binary operators in decreasing order of priority:
1. * (multiply) \(divide) % (modulus operator)
2. +(plus) -(minus)
3. >>(right shift bit manipulation) <<(left shift)
4. <(less than) >(greater than) <=(less than or equal to) >=(greater than or equal to)
5. ==(equal to) !=(not equal to)
6. & (bitwise AND)
7. ^(bitwise exclusive OR)
8. I (bitwise inclusive OR)

9. && (AND)
10. II (OR)

CGL also includes assignment operators and expressions. That is, expressions such as i=i+2 in which the left hand side is repeated on the right can be written with an assignment operator as follows:

i+=2

As is known to those of skill in the art, additional assignment operators include the following:

-= *= /= %= >>= <<= &= ^= |=

In addition, the embodiment of the invention provided in the appendix recognizes an operator ("in") which operates in the same manner as the corresponding operator in the Pascal programming language. Specifically, this operator tests to determine whether a value is found in a specified set. For example, for the last line of the following lines of code will return true (1).

r1=5
r2[]={2,3,5}
r1 in r2[]

Some other functions include the following:

1. Beginning of Set (syntax: value bos(<ordered-set>)) The bos function returns true (1) if the current item pointer of the ordered set is the first item. Otherwise, bos returns false (0).
2. End of Set (syntax: value eos(<ordered-set>)) The eos function returns true (1) if the current item pointer of the ordered set is the last item. Otherwise, eos returns false (0).
3. First (syntax: <scalar>first(<ordered-set>)) The "first" function returns the first item of the ordered set, and moves the current item pointer to that first item.
4. Last (syntax: <scalar>last(<ordered-set>)) The "last" function returns the last item of the ordered set, and moves current item pointer to that last item.
5. Next (syntax: <scalar>next(<ordered-set>)) The "next" function returns the "next" item of the ordered set (the item to the right of the current pointer location), and moves current item pointer to that next item
6. Prev (syntax: <scalar>prev(ordered-set>)) The "prev" function returns the previous item of the ordered set (the item to the left of the current pointer location), and moves the current pointer to previous item.
7. Append (syntax: append (ordered-set, scalar-var)) The append function adds an item to an ordered-set.
8. Rand (syntax: <simple-operand-scalar>rand(<value1>, <value2>)) The rand function returns a random number between the boundaries value1 and value2. For example mode=rand (0, 7);

will return a random value between 0 and 7 when the variable "mode" is any simple operand of scalar category.

V. Compilers

Figure 6:
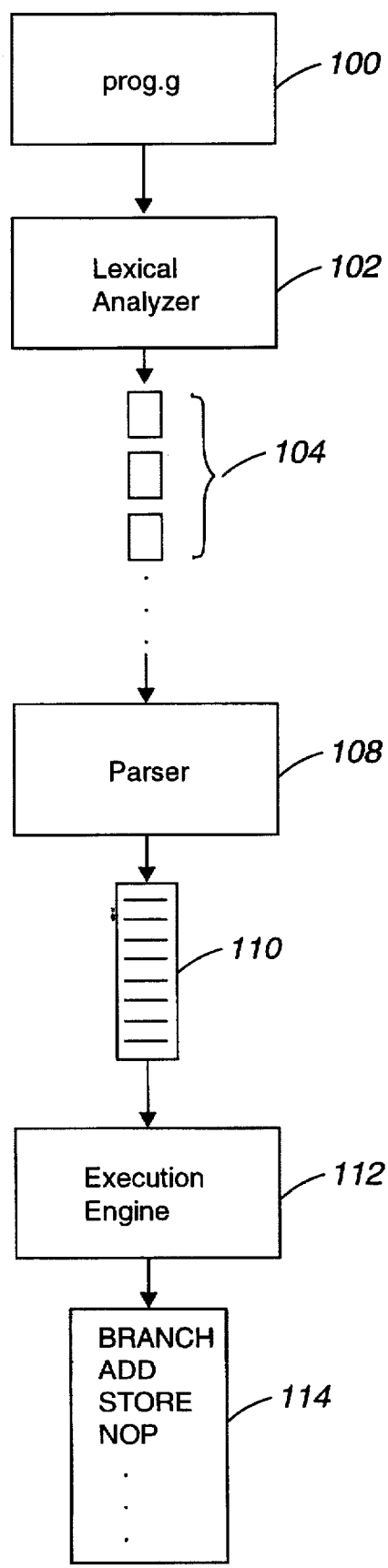
FIG. 6 is an illustration showing the entities involved in compiling and executing a program written accordance with this invention to produce a sequence of assembly language instructions.

FIG. 6 illustrates one arrangement (and the arrangement employed in the embodiment of the Appendix) for compiling and executing a program written in CGL to output an assembly language sequence. A CGL program 100 is provided as a ".g" file in a computer system such as the system depicted in FIG. 1. For example, the writer of the program may name his or her CGL program "prog.g." Upon entering an appropriate command, the program 100 is provided to a lexical analyzer 102 which divides the program into tokens (terminals) 104 and passes them to a parser 108. The parser 108, upon receiving such tokens, checks the program grammar to ensure that it is correct and then generates "intermediate code" 110 which is stored in a memory array. From there, the intermediate code is executed by an execution engine 112 such that the desired assembly language code is output a file 114. That is, file 114 will contain a sequence of assembly language instructions as specified by the CGL program 100. These instructions can then be integrated into a larger program or directly converted to machine instructions by an assembler.

As known to those of skill in this art, a compiler (such as one containing a lexical analyzer and a parser) can be prepared by standard techniques. The Appendix contains the source code (in "C") for a compiler employed in the preferred embodiment of CGL as described above. This compiler was prepared using the "lex" and "yacc" tools (provided with a SunOS such as is available on a Sun SPARC Station) together with a grammar having the above described properties. The grammar was developed using standard techniques.

The files provided in the Appendix are options.h, math64.h, instr_fld.tb1, instr_set.c, math64.s, rtype.h, gmath64.c, utils.h, utils.c, error.h, error.c, asi.h, asi.c, sym_tb1.h, sym_tb1.c, sparcg.h, sparc.1, sparc.y, sparcg.c, network.h, network.c, sparcgen.c, instruction.tb1, instr_set_gen.c, instr.1, instr.h, and instr.y. If the source code for each of these files is stored in a directory and then the command "make" is typed, a compiler for programs written according to the rules of the above described language will be produced. The above files should be used with a SunOS such as is provided on Sun SPARC Stations To generate an assembly language code output file with this compiler, the following syntax should be employed:

sparcgen <options>prog.g

The "prog.g" file should contain a program written in accordance with the above described rules. The options for this command are listed in the "sparcgen.c" file. compilation and execution of the prog.g file will output a "prog.s" file which contains the desired assembly language code. The prog.s code can be assembled and run on a SPARC microprocessor.

Although the foregoing invention has been described in some detail for purposes of clarity of understanding, it will be apparent that certain changes and modifications may be practiced within the scope of the appended claims. For instance, although the specification has described a system employing a code generation language for generating assembly language instructions for a SPARC chip, other languages could be used for generating assembly language instructions for other microprocessors having a variety of architectures and be provided by a variety of vendors. For example, the code generation language may generate output in an assembly language syntax for operating an Intel X86microprocessor, a DEC alpha microprocessor, etc. In addition, the reader will understand that the system of this invention can generate test instructions for reduced instruction set (RISC) chips, complex instruction set (CISC) chips, etc.

What is claimed is:

1. A method, implemented on a digital computer, for controlling the generation of a sequence of assembly language instructions, the method comprising the following steps:

providing a program containing code for generating said sequence of assembly language instructions, said program being written in a language which allows declaration of variables in data types which specify assembly language syntax elements; and compiling said program to produce said sequence of assembly language instructions, wherein said compiler is arranged to recognize the data types which specify assembly language syntax elements, wherein said data types include an instruction data type which specifies a corresponding assembly language instruction, wherein compiling said program directly outputs said instruction data type as said corresponding assembly language instruction.

2. The method of claim 1 wherein said language further includes a string conversion operator which when associated with a variable in said program causes said variable to be outputted in a standard assembly language syntax for the data type of said variable during said step of compiling.

3. The method of claim 1 wherein the language includes one or more data types which specify operands for assembly language instructions.

4. The method of claim 3 wherein the data types which specify operands for assembly language instructions include integer registers, floating point registers, condition codes, and constant values.

5. The method of claim 3 wherein the data types which specify operands for the assembly language instructions may be simple or compound, wherein compound data types specify combinations of two or more variables of the simple operand data type.

6. The method of claim 1 wherein the language includes a data type specifying one or more assembly language instructions.

7. The method of claim 6 wherein said data type specifying assembly language instructions allows variables to be declared which include multiple instructions.

8. The method of claim 7 wherein the variables including multiple instructions are ordered sets, arrays, or tuples.

9. The method of claim 7 wherein, said language allows selection of certain of said multiple instructions by a regular expression.

10. The method of claim 1 wherein the language includes a mask data type specifying a particular data pattern.

11. The method of claim 10 wherein said program employs a variable of the mask data type to provide said particular data pattern to a memory location.

12. A system for controlling the generation of an assembly language instruction sequence, with the aid of a digital computer, the system comprising:

a compiler, said compiler being arranged to recognize data types specifying assembly language syntax elements, said compiler further being arranged to compile a program containing variables of said data types specifying assembly language syntax elements to control generation of the assembly language instruction sequence, wherein said data types include an instruction data type which specifies a corresponding assembly language instruction, and said compiler is further arranged to directly output said instruction data type as said corresponding assembly language instruction.

13. The system of claim 12 wherein said compiler also recognizes a string conversion operator associated with a variable of a recognized data type in said program, said compiler compiling said variable such that it will be outputted in a standard assembly language syntax for the recognized data type of said variable.

14. The system of claim 12 further comprising means for executing an executable version of said program which was produced by said compiler, the means for executing outputting said assembly language instruction sequence.

15. The system of claim 12 wherein the compiler recognizes one or more data types which specify operands for assembly language instructions.

16. The system of claim 15 wherein the data types which specify operands for assembly language instructions include integer registers, floating point registers, condition codes, and constant values.

17. The system of claim 15 wherein the data types which specify operands for the assembly instructions may be simple or compound, wherein compound data types specify combinations of two or more variables of the simple operand data type.

18. The system of claim 12 wherein the compiler recognizes a data type specifying one or more assembly language instructions.

19. The system of claim 18 wherein said data type specifying one or more assembly language instructions allows variables to be declared which include multiple instructions.

20. The system of claim 19 wherein said compiler recognizes, in said program, regular expressions for selecting certain of said multiple instructions from among those in a variable declared as including said multiple instructions.

21. The system of claim 12 wherein the compiler recognizes a mask data type specifying a particular data pattern.

\* \* \* \* \*